May 3, 1932.  G. W. HEENE  1,856,761
EMBOSSING AND VENDING APPARATUS
Filed Oct. 6, 1930
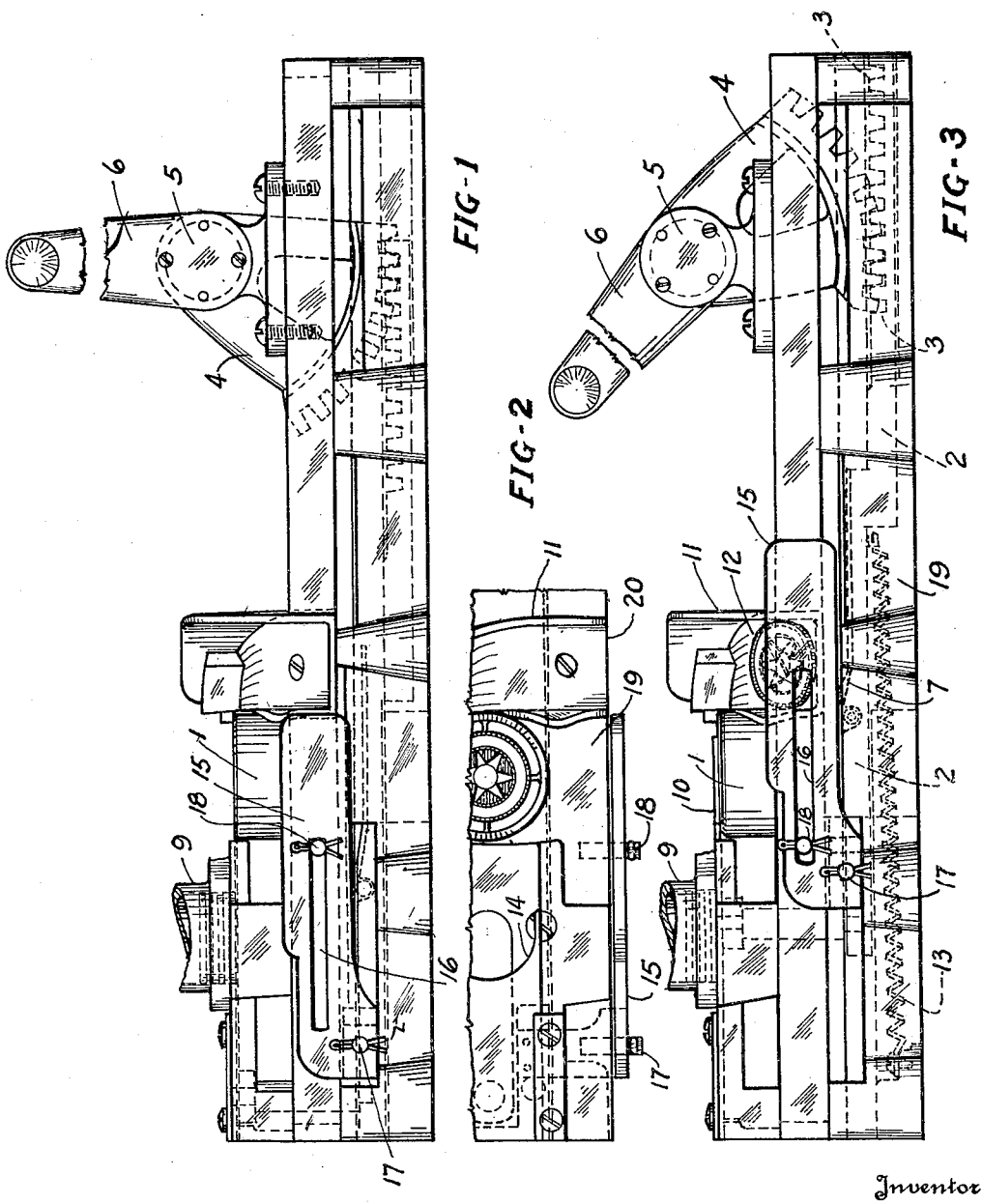
Inventor
George W. Heene
By Arthur H. Van Horn
his Attorney Patented May 3, 1932

1,856,761

UNITED STATES PATENT OFFICE

GEORGE W. HEENE, OF CLEVELAND, OHIO

EMBOSSING AND VENDING APPARATUS

Application filed October 6, 1930. Serial No. 486,588.

My invention is an improvement in an embossing and vending apparatus of the type disclosed in my Patent No. 1,494,839, patented May 20, 1924, and relates more particularly to means for regulating the delivery of a finished or embossed blank to a customer.

One of the objects of my invention is to prevent the delivery of a finished blank from a discharge chute or the like until such time as a new blank is deposited in the chuck and firmly held thereby to permit the new blank to be embossed by one or more selective dies.

A further object of my invention is to prevent the delivery of an embossed blank to a customer until the associated parts of the apparatus are returned to a predetermined position so that the complete cycle of operation of the machine may be utilized again by a subsequent customer.

Other objects and advantages of my invention will become more apparent from the following description of an embodiment thereof reference being made to the accompanying drawings in which like reference characters are employed to designate like parts throughout the same.

Figure 1 is a side elevation of an embodiment of my invention, showing also in elevation associated parts of the blank seating and delivering mechanism.

Figure 2 is a fragmentary top view of the parts shown in Figure 1, with the blank feeding magazine removed.

Figure 3 is a view similar to Figure 1, except that the gate is shown in its extreme limit of movement to the right to prevent the premature delivery of an embossed blank from the delivery chute. The cooperating blank seating and delivery parts are shown in their respective positions in this view when the gate is moved to the position shown.

As shown in my Patent No. 1,494,839, issued May 20, 1924, I provide a chuck supported on a slide 2 for firmly gripping a blank during the embossing operation. The forward end of the slide is provided with a series of teeth 3 which are in mesh with a gear segment 4 keyed to a shaft 5. An operating handle 6 is also keyed to the shaft and by moving this handle the slide may be actuated under the chuck 1. The supporting surface of the slide is provided with inclined walls 7 which in passing under the chuck and its core, cause the chuck jaws to be released from the blank and cause the core to be lifted to move the embossed blank upwardly into the plane of movement of a succeeding new blank delivered from the magazine 9. A slide 10 is movable with the slide 2 when the lever 6 is operated and feeds one blank from the bottom of the magazine 9 toward the finished blank left on the core of the chuck. As the slide 10 continues to move to the right the finished blank is pushed transversely from the core and chuck into a delivery chute 11 having a downwardly disposed base 12, a new blank being deposited in proper position on the core. When the handle 6 is released the springs 13 which have been placed under increased tension will return the slides 2 and 10 to the position shown in Figure 1, permitting the core to drop in the chuck to lower the new blank into a plane where it will be gripped by the chuck jaws as the latter are closed.

According to the present invention, I have provided means to obstruct the discharge end of the chute 11 during such time as the slides 2 and 10 are in an extended position as by operating the lever 6. In this manner, although the embossed blank may have been discharged from the chuck and into the chute 11 prior to the return of the slides 2 and 10 to the normal position of rest, the discharge end of the chute 11 may be obstructed until such time as the slides return to approximately the position shown in Figures 1 and 2. It will therefore be seen that the delivery of an embossed blank directly to the customer is delayed until such time as the parts are returned to position for proper use by the next customer. I have found in practice that without delaying the delivery of the embossed blank in this manner, the user often picks up the delivered blank without making sure that the slides 2 and 10 have been returned to their normal positions of rest. This is particularly true in the event that binding is experienced between the slide 2 and the chuck 1 in the return movement of the slide 10 to the position shown in Figure 2 to permit a new blank to be fed from the magazine and properly seated in the slide. Consequently a succeeding customer, unaware of the improper setting of the parts of the apparatus, deposits a coin in the machine and proceeds with the embossing operation. After he has finished the embossing of the blank delivered to the chuck in the last operation he proceeds to operate the lever 6 to discharge the blank into the chute. There being no new blank in the opening 14 of the slide 10, the finished blank on the chuck 1 will not be delivered into the chute, and this customer will be deprived of his embossed blank.

The present invention thus prevents damage to the machine by unintelligent use thereof, since, if the first customer does not receive his finished blank he will realize that the slide 2 has not returned to its extreme limit of movement to the left in Figure 3 and will proceed to complete this movement by operating the handle 6 by a light blow to the side of the machine, in event that the slide 2 becomes bound.

In carrying out the present invention I provide a gate 15 which is provided with an elongated slot 16 and which is secured to the slide 2 by means of a pin 17. A pin 18 carried by the base 19 extends through the slot 16 to guide the gate in its movement with the slide 2. It will be noted that the gate 15 extends in a plane substantially parallel to the slide 2 and operates across the discharged end 20 of the chute 11 to close the same as shown in Figure 3. The gate 15 is of sufficient length that it will effectively prevent the passage of an embossed die directed to the chute 11 from the chute end into a suitable receptacle within reach of the operator, until such time as the slides 2 and 10 have resumed their normal positions as shown in Figure 1.

Various changes in the details of construction and arrangement of parts may be made without departing from the spirit of my invention or the scope of the appended claims.

I claim:

1. In an embossing and vending apparatus, the combination with a blank feeding mechanism, and releasable means for holding the blank during the embossing operation, and a slide for releasing said releasable means, of a discharge chute to receive a finished blank, and a slidable gate operating to close the mouth of the chute and delay the delivery of the blank therefrom, said gate being supported on said slide and movable therewith and across the mouth of the chute.

2. In an embossing and vending apparatus, the combination with a blank feeding mechanism, and releasable means for holding the blank during the embossing operation, and a slide for releasing said releasable means, of a discharge chute to receive a finished blank, and a slidable gate operating to close the mouth of the chute and delay the delivery of the blank therefrom, said gate being supported on said slide and movable therewith and across the mouth of the chute, said gate being slotted for a portion of its length, and a guide member operating in said slot to maintain the gate in operable position as it is moved across the mouth of the chute.

In testimony whereof I hereunto affix my signature.

GEORGE W. HEENE.